United States Patent
Maeda

[19]

[11] Patent Number: 6,145,841
[45] Date of Patent: Nov. 14, 2000

[54] MECHANICAL SEAL

[75] Inventor: Shigeki Maeda, Takahashi, Japan

[73] Assignee: Eagle Industry Co., Ltd., Tokyo, Japan

[21] Appl. No.: 09/178,636

[22] Filed: Oct. 26, 1998

[30] Foreign Application Priority Data

Aug. 27, 1998 [JP] Japan .................................. 10-241893

[51] Int. Cl.⁷ .................................................... F16J 15/38
[52] U.S. Cl. .............................. 277/358; 277/92; 277/42; 277/43
[58] Field of Search ................................. 277/92, 22, 38, 277/39, 88, 87

[56] References Cited

U.S. PATENT DOCUMENTS

| | | | |
|---|---|---|---|
| 4,451,049 | 5/1984 | Charhut . | |
| 4,502,698 | 3/1985 | Collins | 277/43 |
| 4,707,150 | 11/1987 | Graham | 277/92 |
| 4,779,876 | 10/1988 | Novosad . | |
| 4,917,389 | 4/1990 | Baker et al. | 277/42 |
| 5,199,719 | 4/1993 | Heinrich et al. . | |
| 5,676,382 | 10/1997 | Dahlheimer . | |
| 5,803,444 | 9/1998 | Shibuya et al. | 267/180 |

OTHER PUBLICATIONS

Abstract of "Mechanical Seal", Japanese Utility Model Publication No. 1–18931, published Jun. 1, 1989.

*Primary Examiner*—B. Dayoan
*Assistant Examiner*—Mark Williams
*Attorney, Agent, or Firm*—Finnegan, Henderson, Farabow, Garrett & Dunner, L.L.P.

[57] ABSTRACT

A high sealability mechanical seal which has a small-volume mating ring, which highly efficiently transmits the shaft's revolving force to the mating ring, and which has a minimal load variation on the sliding face. The gist of the present invention is in a mechanical seal where the bellows is made of rubber; a coiled wave spring which is a spirally wound narrow thin strip is interposed in a compressed state between the end of the seal ring side of the bellows and a middle wall of the roughly U-shaped cross-sectional cartridge; and the other end of the bellows is mounted, on the inner circumferential side of the coiled wave spring, via a driving band in the inner circumferential casing of said roughly U-shaped cross-sectional cartridge.

1 Claim, 3 Drawing Sheets

MECHANICAL SEAL

BACKGROUND OF THE INVENTION

1. Field of the Invention

The present invention relates to a mechanical seal having an external casing, which is, for example, used as a shaft seal device in a cooling water pump for an automobile engine.

2. Description of the Related Art

External-casing type mechanical seals are known, as illustrated in FIG. 1 as a type of mechanical seal (see Japanese Utility Model Publication H1-18931 and U.S. Pat. Nos. 5676382, 5199719, 4779876, and 4451049) Such a mechanical seal roughly consists of an inner circumferential casing which is secured to, and rotates with, the shaft of a drive mechanism, for example, an automobile engine cooling water pump, and an outer circumferential casing which is secured to a pump housing. A mating ring 1 as a sliding [mating] member, which rotates with the shaft, is installed in the inner circumferential casing; and the inner circumferential and the back face sides of the mating ring 1 are press fit via a cup gasket 2 into a roughly U-shaped cross-sectional end 3a of sleeve 3.

In the outer circumferential casing, a seal ring 4 which slides against the mating ring 1 and a bellows 5 which is used for biasing the seal ring 4 in an axial direction are arranged adjacently to each other and are fitted in a roughly U-shaped cross sectional cartridge 6. Bellows 5 ends 5a and 5b are both biased in the axial direction by a coil spring 8 through a spring holder 7 and also are securely adhered to the seal ring 4 and the cartridge 6.

In the aforementioned inner circumferential casing, the mating ring 1 is press fit into the roughly U-shaped cross-sectional end 3a of the sleeve 3 via a cup gasket 2 while in the outer circumferential casing, the seal ring 4 is fitted into the cartridge 6 via bellows 5, spring holder 7 and bellows 5; and then sleeve 3 inner casing portion 3b is inserted in the inner side of the inner casing 6b of the cartridge 6; then the tip 3c of the sleeve 3 inner casing 3b portion is flared, whereby a mechanical seal is integrated. Said mechanical seal integrated in such a manner is press fit using a mounting jig , for example, around a pump shaft and into the housing.

The sliding face 4a of the seal ring 4 is pressed by the biasing forces from the bellows 5 and coil spring 8 which are exerted in the compressed state in the axial direction against the mating ring 1 so that an appropriate face pressure is provided thereto.

However, the type of mechanical seal illustrated in FIG. 1 is deficient in that in attempting to conform to the recently accelerated downsizing trend, for example, in cooling water pumps, on which the mechanical seals are mounted, it is difficult to reduce the size of the coil spring 8 in the axial direction without increasing its diameter; this is because the coil spring 8 which extends in an axial direction is fitted into the cartridge 6, and bellows 5 ends, 5a and 5b, are both held within the cartridge 6, so that the mechanical seal does not structurally permit its substantial size reduction or downsizing in an axial direction, thereby hindering the effort to downsize a pump.

Another deficiency is that in the mechanical seal illustrated in FIG. 1, the face pressure on the sliding face 4a of the seal ring 4 against the mating ring 1 is produced by the biasing force of coil spring 8 coupled with the biasing force of bellows 5, where the proportion of the biasing force from the bellows 5 is relatively large with respect to the entire biasing force, which, coupled with the inevitable variations in the biasing force depending upon the parts manufacture and mounting precision, makes these adverse effects on seal performance unavoidable.

The present invention is aimed at downsizing and providing a mechanical seal with minimal variations in load at the sliding surface.

SUMMARY OF THE INVENTION

The gist of the present invention is:

A mechanical seal comprising an inner circumferential casing which is secured to the shaft of a drive mechanism and rotates with the shaft and an outer circumferential casing which is secured to the housing of said drive mechanism, said inner circumferential casing having a mating ring mounted as a sliding member which rotates with the shaft, with the inner circumferential and back sides of the mating ring being press fit into the end of a sleeve via a cup gasket; and said outer circumferential casing having mounted therein a seal ring that slides against the mating ling and an adjacent bellows for biasing the seal ring in an axial direction, which are fitted into a roughly U-shaped cross-sectional cartridge, wherein the bellows is made of rubber, a coiled wave spring, which is a spirally wound narrow thin strip, is interposed in a compressed state between the seal ring side end of the bellows and the middle wall of the roughly U-shaped cross-sectional cartridge, and the other end of the bellows is mounted, on the inner circumferential side of the coiled wave spring, via a driving band in the inner circumferential casing of the roughly U-shaped cross-sectional cartridge.

Conventional mechanical seals use a cylindrical or conical coil spring to apply face pressure, that is, a load against the sliding face. Therefore, factors such as coil spring load, wire diameter, number of windings, and the like inherently have limited the extent to which one can reduce the size of the spring in the axial direction without increasing its size in the radial direction. In contrast, this invention has a feature in that it replaces the conventional cylindrical or conical coil spring with a coiled wave spring, uses a rubber bellows one end of which is equipped with a driving band. This construction enables one to substantially reduce spring size in the axial direction, making it possible to downsize the mechanical seal and at the same time minimizing load variation at the sliding face.

DETAILED DESCRIPTION OF THE INVENTION

Figure 2:
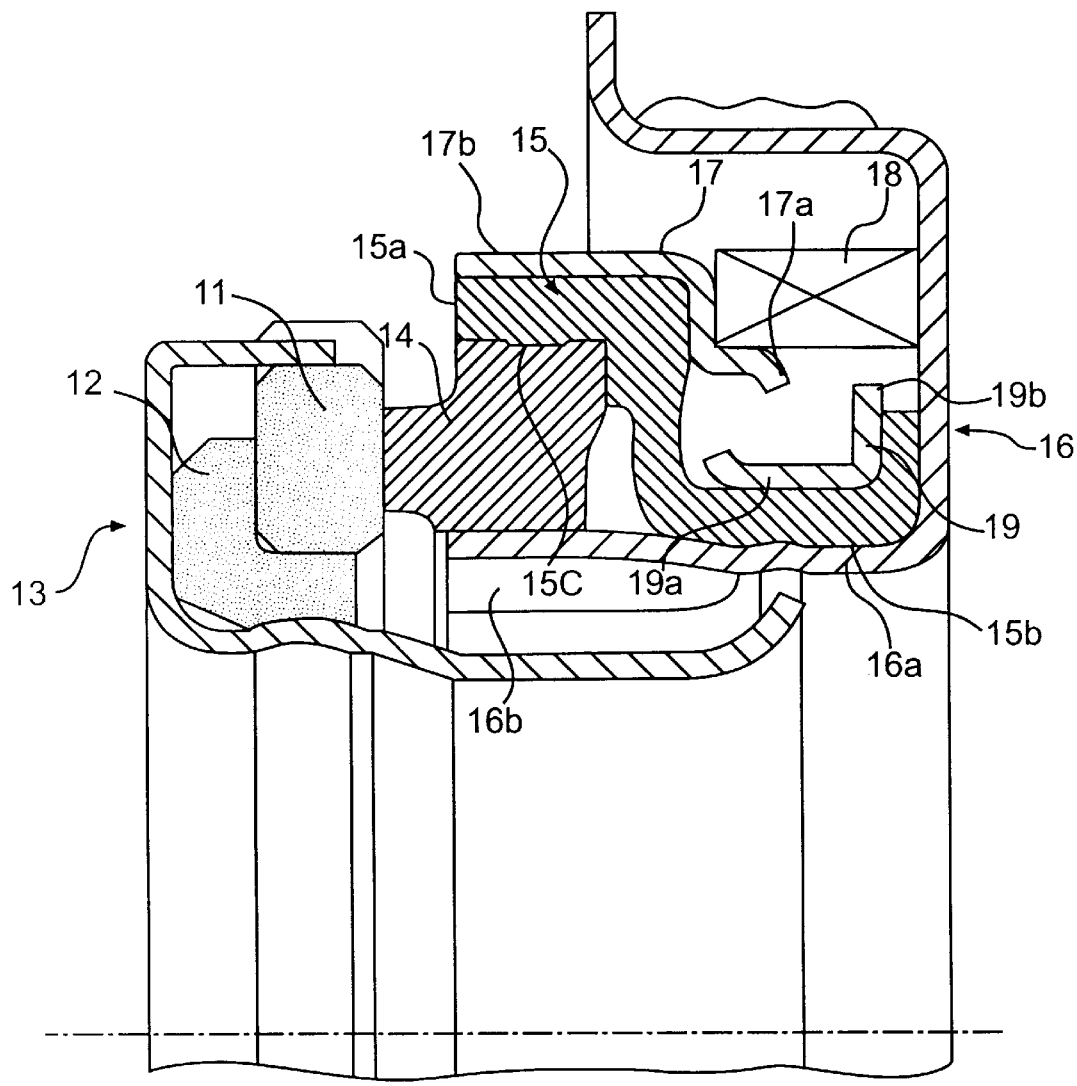
FIG. 2 is a vertical cross-sectional view of a mechanical seal in accordance with the present invention.

A mechanical seal related to the embodiment of the present invention is described by referring to the attached drawings. FIG. 2 is a cross-sectional view of an example of a mechanical seal related to the embodiment of the present invention. As with the prior art mechanical seal, mating ring 11 is press fit in sleeve 13 via a cup gasket 12 on the inner circumferential and back sides thereof. There are a number of types of detents for the mating ling 11 relative to sleeve 13; the present example accomplishes the detents by providing the mating ring at its outer circumferential side with at least two notches in which lugs generated on the outer circumferential side of the sleeve are engaged. (These are not illustrated.)

Seal ring 14, a sliding member on the side secured to the housing of a pump, is fit into cartridge 16 along with bellows 15, case 17, driving band 19, and coiled wave spring 18. Herein, driving band 19 and case 17 are mounted on the outer circumferential side of bellows 15 and the assembly is secured to the inner casing portion 16a of the cartridge 16. Bellows 15, which is interposed between the driving band 19 and the inner circumferential portion 16a of the cartridge 16, has an appropriate interference fit for ensuring sealability and securing force. For positioning bellows 15 during its mounting in an appropriate position of the cartridge 16, one end face 17a of the case 17 is flared, facing one end face 19b of the driving band 19.

Thus, when force is applied to push the outer circumferential portion 17b of case 17 in the right-hand direction in the drawing in the direction of compressing the coiled wave spring 18, the end face 17a of the case 17 will come into contact with the end face 19b of the driving band 19, in turn forcing driving band 19 in the right-hand direction; as a result this accomplishes mounting the bellows 15 in an appropriate position with respect to the inner casing portion 16a of the cartridge 16. Then, securing the bellows to the cartridge's inner circumferential portion using the driving band 19 is expected to prevent the bellows from slipping in relation to sliding torque.

In addition, seal ring 14 and bellows 15 can be secured by first having the outer circumferential portion 17b of case 17 tapered, followed by setting up the seal ring 14 in the inner side of the inner casing portion 15c of the bellows 15, and then tightening the outer circumferential portion 17b of case 17 from the outer circumferential side. Bellows 15 has an appropriate interference fit so as to ensure its sealability and securing force. The coiled wave spring 18 is interposed between the case 17 and cartridge 16. The bellows 15 can be made to have a different configuration from that of the prior art to reduce the extent to flex, thereby reducing the pressing load it generates and minimizing its variation.

In general, rubber, an elastomeric material, is used for the bellows so as to seal the operating seal fluid and to apply an appropriate pressing force against the seal ring. The pressing force is mainly provided by the spring, but the bellows, mounted in a compressed state, generates a load as its repulsive force. That is, the total load as the pressing force is the sum of loads from the spring and the bellows. It should be noted here that the bellows, being made of rubber, will degrade with time due to the operating seal fluid and the effect of heat and will generate a reduced bellows loading, lowering the pressing force. Decreasing pressing force will lower the pressure against the sliding face, generating the concern that sealability may be lost. On the other hand, the total load should preferably be lower in terms of torque loss and noise suppression.

Figure 1:
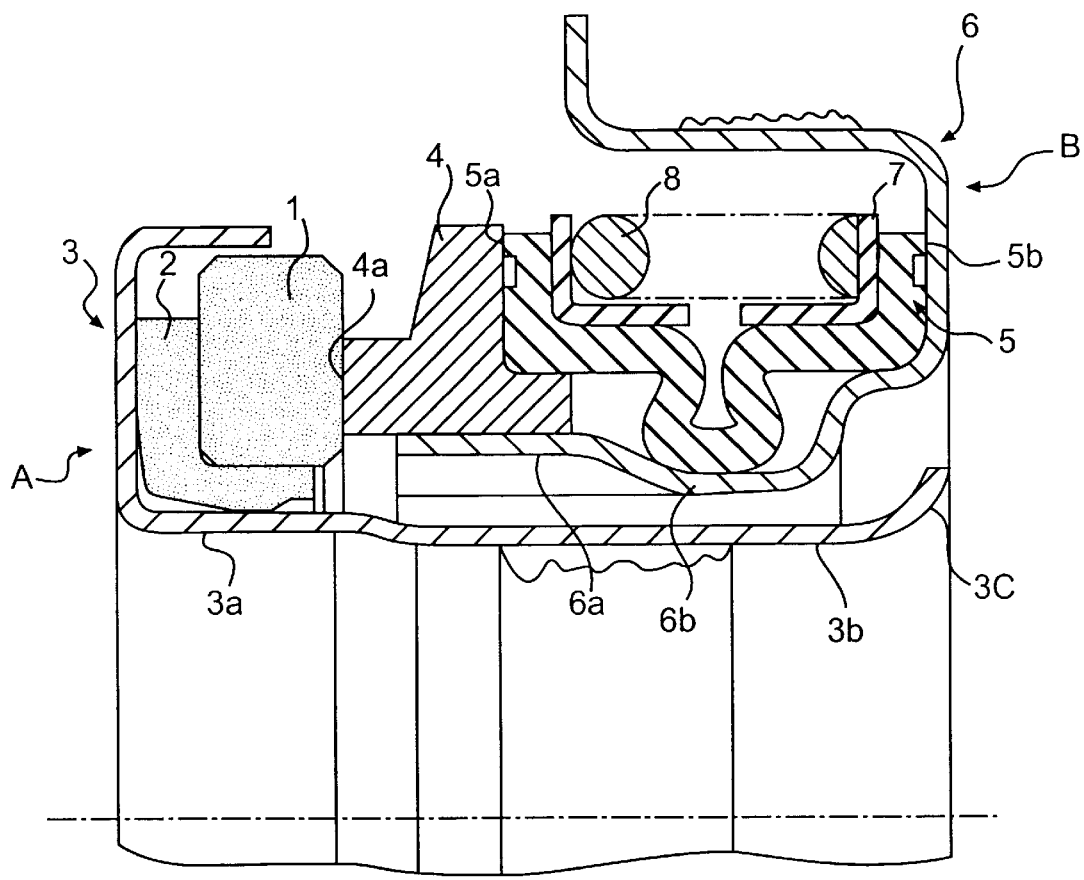
FIG. 1 is a vertical cross-sectional view of a conventional mechanical seal.

In order to solve the above problems, the present invention was provided with an improved way for the bellows to be folded so as to reduce the load from the repulsive force from the bellows. That is, in contrast to the prior art mechanical seal that has its bellows folded to an extreme degree into the roughly protruding shape shown in FIG. 1, the bellows 15 is folded only into a roughly u-shaped form as illustrated in FIG. 2. As a result, as shown in Table 1, the bellows load as a repulsive force is reduced to 3.92 N {0.4 kgf} from a prior art value of 9.80 N {1.0 kgf}, this difference reducing the total load in this invention.

Changing the bellows shape into a roughly u-shaped configuration can at the same time reduce the flexing stress of the bellows as installed, thereby also enabling one to minimize the bellows degradation with service time. Analytical results of the maximum flexing stresses of the bellows are given in Table 2. Table 2 shows that the bellows of the present invention has the lower maximum flexing stresses of 2.75 MPa {0.28 kgf/mm$^2$} at atmospheric pressure and 11.28 MPa {1.15 kgf/mm$^2$} at a fluid pressure of 0.29 MPa {3 kg/cm$^2$} than those of the prior art bellows at 6.86 MPa {0.70 kgf/mm$^2$} and 14.02 MPa {1.43 kgf/mm$^2$}, respectively. Reduction of the bellows flexing prevents cracks or tears of the flexing part of the rubber bellows after they have been subjected to a long period of use in a mechanical seal, thereby contributing to improved seal reliability.

TABLE 1

| | Loads on Bellows (Unit: N {kgf}) | |
|---|---|---|
| | This Invention | Prior Art |
| Bellows Load | 3.92 {0.4} | 9.80 {1.0} |
| Spring Load | 17.64 {1.8} | 17.64 {1.8} |
| Total load | 21.56 {2.2} | 27.44 {2.8} |

TABLE 2

| Analytical Results of Bellows Maximum Flexing Stress (unit: MPa {kgf/mm$^2$}) | | |
|---|---|---|
| | This Invention | Prior Results |
| At Atmospheric Pressure | 2.75 {0.28} | 6.86 {0.70} |
| At Fluid Pressure (0.29 MPa {3 kg/cm$^2$}) | 11.28 {1.15} | 14.02 {1.43} |

Shaping the bellows roughly in a u-shaped configuration reduced bellows load variation, resulting in a reduced total load variation and increased seal stability.

In addition, the mechanical seal is structured to prevent the seal ring 14 from twisting in a radial direction in relation to the sliding torque by means of at least two detents at mutually engaging positions on the seal ring 14's inner circumferential portion and the end face 16b of the cartridge 16.

Figure 3B:
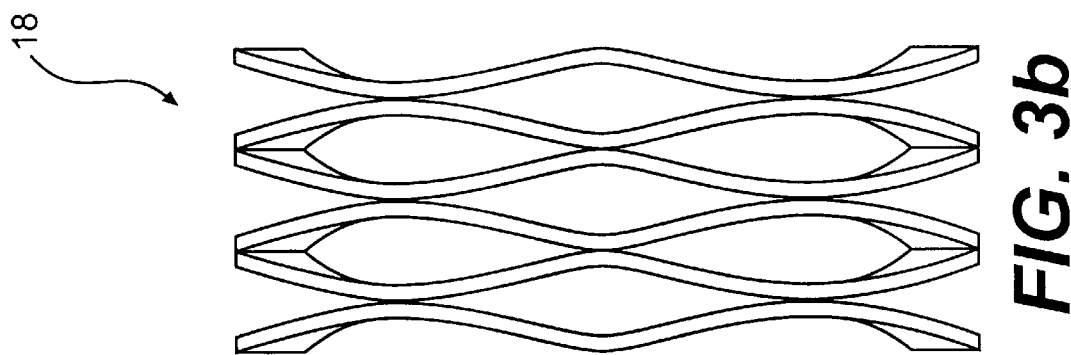
FIG. 3(b) is a cross-sectional schematic drawing of the coiled wave spring of FIG. 3(a).
Figure 3A:
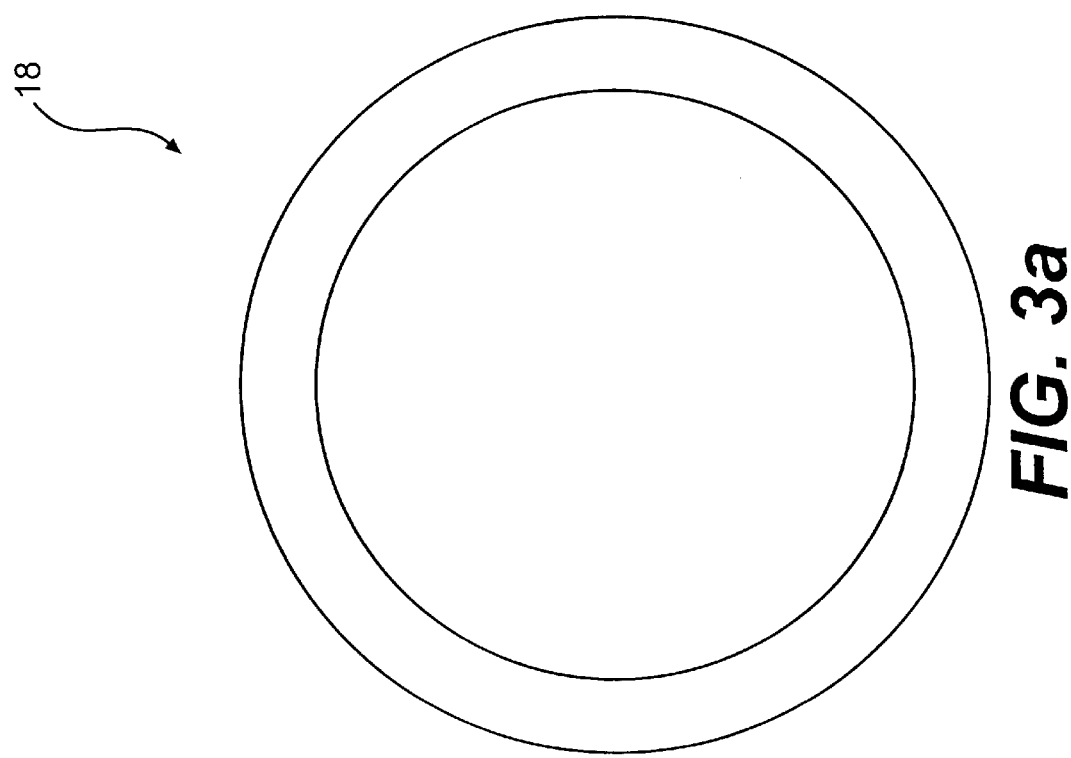
FIG. 3(a) is a flat schematic drawing of a coiled wave spring mounted on a mechanical seal.

A coiled wave spring 18 in a compressed state is interposed between case 17 at one end 15a of the bellows 15 and a middle wall 16b of the cartridge 16 which has a roughly U-shaped cross-section. The coiled wave spring 18, as illustrated in FIG. 3, is a spirally wound narrow thin sheet; an example of the specification is as given in Table 3 below for the total number of windings, effective number of windings, number of waves/winding, peak/flat length, and winding direction.

TABLE 3

| Characteristic Items | Characteristic Values |
|---|---|
| Total number of windings | 4.0 |
| Effective number of windings | 4.0 |
| Number of waves/winding | 3.5 |
| Peak/flat length (mm) | 1.5 |
| Winding direction | Right-hand |

[Advantageous Effect of the Invention]

Use of a coiled wave spring as a compression spring and mounting, in an inner circumferential side thereof, a lightly flexing rubber bellows permits the substantial reduction in size [of a mechanical seal] in the axial direction. The reduction in size of a mechanical seal in the axial direction will permit downsizing the pump to be mounted therewith and also contribute to an overall cost reduction. Furthermore, improving the shape of the bellows will minimize the variation of the loads on the bellows, and in turn that of the total load. Minimizing the total load variation is substantially effective for the stabilization of sealability. Reduced flex in the bellows will prevent cracks or tears of the flexing portion of the rubber bellows after its use over a period of long time. The bellows is secured to an inner circumferential portion using a driving band, thereby enhancing the ability to prevent a slip relative to the sliding torque.

What is claimed is:

1. A mechanical seal comprising an inner circumferential casing which is secured to a shaft of a drive mechanism and rotates with the shaft and an outer circumferential casing which is secured to a housing of said drive mechanism, said inner circumferential casing having a mating ring mounted as a sliding member which rotates with the shaft, with inner circumferential and back sides of the mating ring being press fit into an end of a sleeve via a cup gasket; and said outer circumferential casing having mounted therein a seal ring that slides against the mating ring and an adjacent bellows for biasing the seal ring in an axial direction, which are fitted into a roughly U-shaped cross-sectional cartridge, wherein the bellows is made of rubber, a coiled wave spring, said coiled wave spring being a spirally wound narrow thin strip, is interposed in a compressed state between a seal ring side end of the bellows and a middle wall of the roughly U-shaped cross-sectional cartridge, and the other end of the bellows is mounted on an inner circumferential side of the coiled wave spring via a driving band in an inner-circumferential casing of the roughly U-shaped cross-sectional cartridge.

* * * * *